W. WHYTOCK, Jr.
METHOD OF MANUFACTURING STRIPS OF CONTINUOUSLY CONNECTED GEM SETTINGS.
APPLICATION FILED NOV. 27, 1908.
950,524.
Patented Mar. 1, 1910.
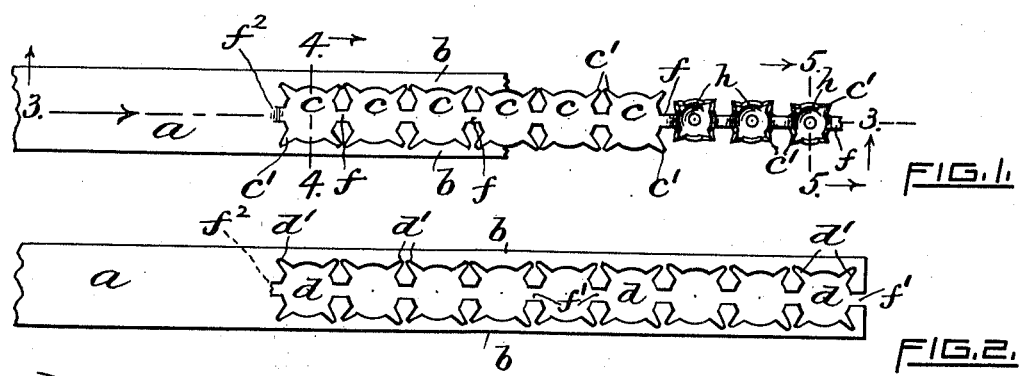
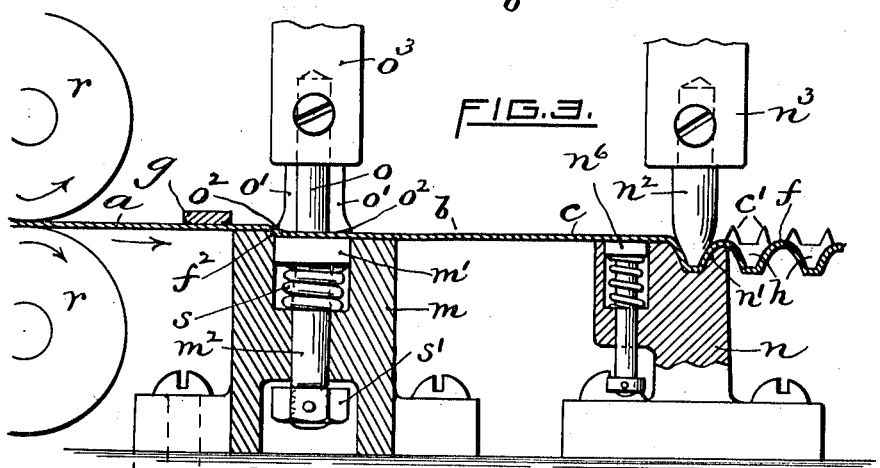
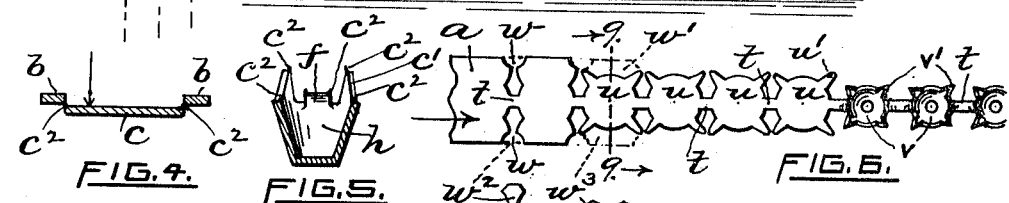
WITNESSES:
INVENTOR:
William Whytock, Jr.,
By Geo. A. Remington
Atty.

UNITED STATES PATENT OFFICE.

WILLIAM WHYTOCK, JR., OF PROVIDENCE, RHODE ISLAND.

METHOD OF MANUFACTURING STRIPS OF CONTINUOUSLY-CONNECTED GEM-SETTINGS.

950,524.

Specification of Letters Patent.  Patented Mar. 1, 1910.

Application filed November 27, 1908. Serial No. 464,792.

*To all whom it may concern:*

Be it known that I, WILLIAM WHYTOCK, Jr., a citizen of the United States of America, and a resident of Providence, in the county of Providence and State of Rhode Island, have invented certain new and useful Improvements in Methods of Manufacturing Strips of Continuously-Connected Gem-Settings, of which the following is a specification.

In the production of strips or continuous lengths of uniformly spaced gem-settings from bendable stock, as for example, thin rolled plate, it has heretofore been usual, so far as I am aware, to employ two or more sets of cutters and punches for perforating and cutting away the waste stock in a step-by-step manner thereby leaving the setting blanks united by narrow alining ties, the blanks being cupped or shaped by suitable tools working in unison with the punches, &c. An objection to such former processes is that the cost of production is comparatively large owing to the small and delicate punches and cutters necessarily required for perforating the stock, and also the added liability of breakage and repairs. Another inherent disadvantage is that the action of the tools in cutting away the waste stock produces and leaves a slight bur or roughness on the then underside of the outer edge of the blanks. In transforming the blanks into the cupped or completely shaped product the said burred edges will then be found on the outer surface of the upper edge of the settings, thereby materially affecting the finish, appearance and value of the product.

The objects I have in view are to completely overcome the disadvantages just referred to.

To that end my improvement consists in cutting the connected blanks from the stock, the waste being simply two continuous marginal strips, thereby leaving the bur, usually present in any cutting and punching operation of this class, on the upper edge of the blanks. In transforming the latter into the connected cup-shaped settings by the shaping die or tools the burred edges will lie on the inner or unexposed surfaces of the upper edges of the product, thus presenting a smooth and finished appearance, the tools employed being strong and durable.

In the accompanying sheet of drawings illustrating means for carrying out my improved process of making continuous gem-settings from strips of bendable sheet-metal stock, Figure 1 represents a top plan view of a short piece of stock as having been acted upon by the cutters, forming tools, &c., portions of the waste stock being removed. Fig. 2 is a similar view of the two corresponding strips of waste stock connected to the parent strip, the connected or continuous length of blanks and settings being omitted. Fig. 3 is a longitudinal sectional view, taken on line 3 3 of Fig. 1, and showing in addition tools and means for feeding, cutting and shaping the settings. Fig. 4 is a transverse section, on an enlarged scale, through 4 4 of Fig. 1, showing the bur formation produced by the cutting tools. Fig. 5 is a sectional view on line 5 5 of Fig. 1, also enlarged, showing the location of the bur on the finished setting. Fig. 6 represents a top plan view, corresponding somewhat with Fig. 1, showing the usual way of perforating the stock or cutting away the waste and leaving the connected strip of blanks and settings. Figs. 7 and 8 represent the forms of the thus cut away stock, and Fig. 9 is an enlarged cross sectional view taken on line 9 9 of Fig. 6, corresponding with Fig. 4, showing the bur formation produced by the cutting tools.

The following is a more detailed description of the means employed and the method of producing continuous lengths of connected cup-shaped gem-settings from narrow strips of bendable thin sheet-metal stock.

I would state here that in practice the stock is fed or advanced so as to be acted upon by the tools in a step-by-step or intermittent manner, the length of each "feed" being that of one unit, blank or setting. The forming plunger is set or positioned in advance of the cutting plunger a multiple of the feed action; in the drawings such intervening distance equals six feeding movements. It is of course understood that the movements or action of the thus separated cutting and forming plungers upon the stock occur concurrently or simultaneously.

Referring now more particularly to Fig. 3 of the drawings, and assuming that the holders $o^3$ and $n^3$ carrying the cutting and forming plungers $o$ and $n^2$, respectively, are mounted in a press and being vertically reciprocated as usual, the narrow strip $a$ of suitable sheet-metal stock (see Fig. 1) is first inserted between the adjacent faces of a pair of adjusted feed-rolls $r$ $r$ adapted to be intermittingly rotated in any well-known way, the result being to advance the free end of the stock and position it upon the then elevated spring-pressed stationary cutter-plate $m^1$; the downward movement of the cutting-plunger to its limit operates to simultaneously cut or shear the blank $c$, including its four points or prongs $c^1$ and about one-half of the length of the narrow tie or bridge $f$, from the stock thus forcing the blank downward and completely severing it from the parent stock, except at the rear end $f^2$ of the back tie, see Fig. 3. The wings $o^1$ of the plunger $o$ produce the said prongs. In order to avoid severing the ties from each other and from the stock the outer ends of the corresponding face of the plunger are curved upward, as shown at $o^2$. Upon the upward return stroke of the plunger the spring $s$ presses the cutter-plate $m^1$ and the blank $c$ upward a short distance, or until arrested by the bottom stop $s^1$ secured to the shank $m^2$ movably mounted in the stationary holder $m$. In thus cutting the blank its upper marginal edge will be left slightly roughened or burred, as indicated, enlarged, at $c^2$, Fig. 4, by the shearing action of the cutting-plunger $o$. The forming-plunger $n^2$ moves simultaneously with the plunger $o$ and works idly until the stock feeding operation causes the first-produced blank to coincide or register with the forward fixed die or matrix $n^1$ formed in the base member $n$; the next stroke of the press forces the plunger $n^2$ downward into engagement with the blank and presses it into the die cavity $n^1$, thereby converting the blank into the practically completed cup-setting $h$ having upwardly extending beveled side walls, its points $c^1$ also being pressed upward, thus causing the said roughened or burred part to lie on the inner portion of the setting's edge, as indicated, enlarged and exaggerated at $c^2$, Fig. 5. At the same time too the rear plunger $o$ will cut a blank, as before stated. The continued conjoint action of the plungers, &c., will convert the strip of stock $a$ into a corresponding bendable strip or length of integrally connected settings $h$ united by the narrow alining central ties $f$. The guide member $g$ serves to maintain the strip in the normal position at the cutting plunger; a spring-pressed clearer $n^6$ is employed to automatically press the adjacent portion of the shaped strip from the die $n^1$ immediately following the upward movement of the swaging plunger $n^2$ and prior to the next succeeding feed action. After cutting the connected series of blanks $c$ from the strip of material there will remain only the two continuous side or marginal strips $b$ $b$ of waste stock, see Fig. 2, wherein $d$ and $d^1$ indicate the spaces or openings produced by the removal of the corresponding members $c$ $c^1$ of the blanks, the spaces $f^1$ corresponding with the removed tie portions $f$.

In the former process of producing a strip of connected settings the free end of the stock $a$ (Fig. 6) is first advanced by the feed action, followed by cutting out by the downward movement of suitable punches or tools the two pieces of waste, $w^2$, Fig. 7, leaving the corresponding perforations $w$ $w$; at the next feed movement the said cutting operation is repeated while at the same time two other oppositely arranged punches cut away the intervening marginal stock. $w^3$, Fig. 8, represents the form of these waste pieces and the dotted lines at $w^1$ the corresponding perforations, thus leaving a blank $u$ having prongs $u^1$ and the central tie $t$. After repeating the foregoing operations, say four times, the first one of the connected blanks $u$ will be positioned under a swaging or forming plunger, as $n^2$ before described, which operates to transform the blank into a cup-shaped setting $v$ having prongs $v^1$, Fig. 6, similar to the said pronged setting $h$. In this last described operation the two pairs of cutting dies which produce the waste pieces $w^2$ $w^3$ and the swaging plunger for shaping the setting work simultaneously. It will be seen that instead of punching the blank from the stock, excepting always the tie portion, the waste itself is completely punched or cut out, see Fig. 9, the action of the cutters being to produce a roughness or bur on the underside of the marginal edge of the blank, as indicated at $u^2$. When the blank is converted into the setting $v$ the said burred part will lie on the outer surface of the then upper marginal edge, the burred portion also extending along the outer edges of the prongs $v^1$.

What I claim as my invention and desire to secure by United States Letters Patent, is:—

1. The improved method of manufacturing strips of continuously connected gem-settings in a step-by-step manner, the same consisting in feeding or advancing the strip of stock, then punching or cutting a substantially complete blank downward from but connected by a tie to the body part of the stock so that the marginal waste will lie in a plane somewhat above the blank, and at the same time transforming a previously produced and longitudinally connected blank of the strip into a cup-shaped gem-setting, and then moving the thus transformed portion into position preparatory to the next feeding step, and continuing the said operations intermittingly throughout the length of the stock.

2. The herein described improved method of manufacturing a strip of continuously connected gem-settings, which consists in positioning the stock with relation to the cutting and shaping tools, then completely punching or cutting and pressing downward at one operation a pronged flat blank from the stock except at a narrow point along the center or median line where it remains connected to the parent stock, the rough or burred part produced by the said punching operation then being on the upper edge, and at the same time transforming an advanced previously cut and connected blank of the strip into a cup-shaped gem-setting so that the said burred part will lie on the upper inner edge of the setting, and then moving the thus transformed portion upward preparatory to repositioning the stock and repeating the above described process.

3. The improved step in the method of manufacturing a strip of continuously connected gem-settings, which consists in punching or shearing the setting blanks downwardly from a correspondingly continuous narrow strip or ribbon of stock thereby producing a rough or burred part on the upper edges of the blanks and a correspondingly burred part on the adjacent lower edges of the scrap or waste stock.

WILLIAM WHYTOCK, Jr.

Witnesses:
  Thomas F. Farrell,
  Edward N. Casey.